(12) United States Patent
Komori et al.

(10) Patent No.: US 10,781,015 B2
(45) Date of Patent: Sep. 22, 2020

(54) MEMBER COUPLING MECHANISM

(71) Applicant: Shimadzu Corporation, Kyoto (JP)

(72) Inventors: Yuki Komori, Kyoto (JP); Hajime Takemoto, Kyoto (JP); Takahiro Saeki, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 253 days.

(21) Appl. No.: 16/027,650

(22) Filed: Jul. 5, 2018

(65) Prior Publication Data

US 2020/0010249 A1    Jan. 9, 2020

(51) Int. Cl.
| | | |
|---|---|---|
| *B65D 39/16* | (2006.01) | |
| *B65D 41/28* | (2006.01) | |
| *F16L 37/107* | (2006.01) | |
| *G01N 30/18* | (2006.01) | |
| *B65D 81/32* | (2006.01) | |
| *G01N 30/12* | (2006.01) | |

(52) U.S. Cl.
CPC ............ *B65D 39/16* (2013.01); *B65D 41/28* (2013.01); *B65D 81/325* (2013.01); *F16L 37/107* (2013.01); *G01N 30/12* (2013.01); *G01N 2030/185* (2013.01)

(58) Field of Classification Search
CPC .. G01N 30/18; G01N 2030/185; G01N 30/12; B65D 39/16; B65D 41/28; B65D 81/325; B65D 39/10; B65D 39/08; F16L 37/107
See application file for complete search history.

(56) References Cited

U.S. PATENT DOCUMENTS 10,551,359 B2 *  2/2020  Takemoto ............. B65D 41/28
2007/0009007 A1   1/2007  Nicholls et al.

FOREIGN PATENT DOCUMENTS

JP       2009-092672 A    4/2009

* cited by examiner

*Primary Examiner* — Robert Clemente
(74) *Attorney, Agent, or Firm* — Maier & Maier, PLLC (57) ABSTRACT

A member coupling mechanism capable of coupling two members using a necessary tightening force even in a limited space by a small and simple configuration. A member coupling mechanism includes a first member including a member coupling portion having an open apical surface, a second member coupled to the member coupling portion of the first member, an elastic sealing member inserted between the first member and the second member to seal an opening of the apical surface of the member coupling portion, a coupling member that couples the first member and the second member together, and an acting portion that exerts a force on the coupling member.

5 Claims, 6 Drawing Sheets

MEMBER COUPLING MECHANISM

FIELD

The present invention relates to a member coupling mechanism used when two members are coupled while maintaining airtightness. For example, such a member coupling mechanism is used in a case in which a seal cap is mounted by inserting an O-ring to seal an opening of a sample vaporization unit of a gas chromatograph, etc.

BACKGROUND

In general, a sample vaporization unit for vaporizing a sample and feeding the sample to an analysis column is provided in a gas chromatograph. An example of the sample vaporization unit will be described. The sample vaporization unit has a housing, a space serving as a sample vaporization chamber is present inside the housing, and a sample inlet for injecting a sample into the sample vaporization chamber is provided in an upper part of the housing. A lower part of the sample vaporization chamber is connected to the analysis column, and a carrier gas is introduced from an upper part of the sample vaporization chamber. The sample vaporization chamber is heated to a high temperature, and a liquid sample injected into the sample vaporization chamber is vaporized by heat and fed to the analysis column by the carrier gas.

A cylindrical insert made of quartz glass, etc. is accommodated in the sample vaporization chamber inside the housing, and the sample injected from the sample inlet is vaporized inside the insert. Since the sample is vaporized inside the insert, sample gas can be introduced into the analysis column without coming into contact with a metal inner wall of the sample vaporization chamber.

The insert is in direct contact with the sample, and thus is a part that is easily stained due to adhesion of a residue, etc. after sample vaporization. For this reason, the insert is accommodated in the sample vaporization chamber in a detachable state so that the insert can be periodically replaced or cleaned (see Patent Literature 1).

In general, an opening communicating with the sample vaporization chamber is provided on an upper surface of the housing, and the opening is sealed by mounting a seal cap with an O-ring interposed therebetween. A sample inlet for injecting the sample by sticking a needle for sample injection is provided in the seal cap. A septum for closing the sample inlet again after the needle for sample injection is withdrawn is provided inside the seal cap.

Patent Literature 1: JP-A-2009-92672
Patent Literature 2: US 2007/0090079 A1

SUMMARY

A structure in which a screw provided on the housing side and a screw provided on the seal cap side are screwed together and the seal cap is turned and fastened is generally adopted as a structure for attaching the seal cap to the housing. However, in such a structure, the seal cap needs to be turned using a tool such as a spanner when the seal cap is attached and detached. However, since a pipe for introducing the carrier gas, etc. is provided around the sample inlet, it is difficult to turn the tool, and an operation is not easy.

In a use for attaching a certain member to another member with airtightness such as a case in which the seal cap is attached to a main body of the sample vaporization unit, these members need to be tightened with a certain strength or more to deform the O-ring interposed between the members to some extent. However, in the above-described scheme in which the screw is fastened by turning the seal cap, it is difficult to determine an amount at which the seal cap needs to be turned to deform the O-ring by a necessary amount. Further, fastening of the seal cap may become weak, and thus airtightness of the sample vaporization chamber may not be sufficiently maintained, or fastening of the seal cap may be excessively strong, and thus the O-ring may be deformed more than necessary and the O-ring may be elastically deformed and damaged.

A bayonet-type coupling tool is present as a mechanism for easily coupling members (for example, see Patent Literature 2). In the bayonet-type coupling tool disclosed in Patent Literature 2, two members may be fixed while being coupled. However, while a tightening force of at least about 30 N is required to deform the O-ring used to maintain airtightness inside the sample vaporization chamber in the gas chromatograph by a necessary amount, such a use is not assumed in the conventional bayonet-type coupling tool, and the tightening force necessary to deform the O-ring by the necessary amount may not be obtained even when the conventional bayonet-type coupling tool is used.

In this regard, an object of the invention is to provide a member coupling mechanism capable of coupling two members using a necessary tightening force even in a limited space by a small and simple configuration.

A member coupling mechanism according to the invention includes a first member including a member coupling portion having an open apical surface, a second member coupled to the member coupling portion of the first member, an elastic sealing member inserted between the first member and the second member to seal an opening of the apical surface of the member coupling portion, a coupling member that couples the first member and the second member together, and an acting portion that exerts a force on the coupling member. The coupling member includes a first engaged portion engaged with an end portion on a side of the apical surface in the member coupling portion of the first member, a second engaged portion engaged with an end portion of the second member on a side of the first member, the second member being disposed on a side of the member coupling portion of the first member, and an elastically deformed portion which is elastically deformed and generates an elastic force for deforming the elastic sealing member by an amount necessary for airtightness by pressing the elastic sealing member using the first engaged portion and the second engaged portion in a direction in which the first engaged portion and the second engaged portion approach each other when an deformation amount becomes a predetermined amount. The acting portion exerts a force for elastically deforming the elastically deformed portion on the coupling member.

As a preferred embodiment of the member coupling mechanism according to the invention, both the member coupling portion of the first member and the end portion of the second member on the side of the first member have cylindrical shapes, the coupling member includes a ring-shaped coupling member body forming the second engaged portion by engaging with the second member while surrounding a periphery of the end portion of the second member on the side of the first member, the elastically deformed portion is an arcuate cantilever spring which is provided on the first member side of the coupling member body with an interval from the coupling member body such that a proximal end is coupled with the coupling member body and a distal end extends in parallel to the coupling member body along a circumferential direction of the coupling member body and is elastically deformed in a direction perpendicular to the apical surface of the first member, the first engaged portion includes a projection projecting from a distal end portion of the elastically deformed portion toward an outer peripheral surface of the member coupling portion, a stepped portion inclined along the circumferential direction of the member coupling portion from a distal end side to a proximal end side of the member coupling portion to elastically deform the elastically deformed portion by engaging with the projection and sliding the projection is provided on the outer peripheral surface of the member coupling portion of the first member, and the acting portion includes a lever that rotates the coupling member body within a plane parallel to the apical surface of the member coupling portion of the first member. By adopting such a configuration, the configuration becomes simpler. In addition, when an operator merely rotates the lever within the plane parallel to the apical surface of the member coupling portion, the projection provided at the distal end of the elastically deformed portion slides along a step provided on the outer peripheral surface of the member coupling portion of the first member. In this way, an elastic force is generated in the elastically deformed portion, and thus a member coupling operation is easy.

The elastically deformed portion preferably includes a horn spring. The horn spring refers to a leaf spring whose cross-sectional shape is a rectangle. Such a horn spring has a larger spring constant than that of another spring, and may obtain a large elastic force with a small amount of deformation. In this way, the coupling member can be further downsized.

Referring to a size of the coupling member, a length from an end portion of the coupling member on a side of the second member to an end portion thereof on a side of the first member in a direction perpendicular to the apical surface of the member coupling portion is preferably 20 mm or less in a state in which the elastically deformed portion is not elastically deformed. In this way, it is possible to provide the coupling member in a part having a limited space such as a sample vaporization chamber of a gas chromatograph.

A spring constant of the elastically deformed portion is preferably 30 N/mm or more and 100 N/mm or less. By setting the spring constant to 30 N/mm or more, it is possible to obtain a tightening force necessary to deform the elastic sealing member inserted between the first member and the second member by a necessary amount and to prevent the elastic sealing member from being deformed more than necessary and damaged even when the elastically deformed portion is reduced in size and a maximum deformation amount thereof is set to 2 mm or less.

Advantageous Effects of the Invention

In a member coupling mechanism according to the invention, since the first engaged portion of the coupling member is engaged with the end portion on the apical surface side in the member coupling portion of the first member, and the second engaged portion of the coupling member is engaged with the end portion of the second member, which is disposed on the member coupling portion side of the first member, on the first member side, a gap between the first engaged portion and the second engaged portion in the coupling member is significantly short, and the coupling member may be reduced in size. In this way, it is possible to provide the coupling member in a part having a limited space such as a sample vaporization chamber of a gas chromatograph. Further, since the coupling member includes an elastically deformed portion which is elastically deformed and generates an elastic force for deforming the elastic sealing member by an amount necessary for airtightness by pressing the elastic sealing member using the first engaged portion and the second engaged portion in a direction in which the first engaged portion and the second engaged portion approach each other when an deformation amount becomes a predetermined amount, and an acting portion that exerts a force for elastically deforming the elastically deformed portion on the coupling member is provided, the operator may deform the elastic sealing member inserted between the first member and the second member by an amount necessary for airtightness using the elastic force of the elastically deformed portion merely by exerting a necessary force on the elastically deformed portion through the acting portion. Therefore, the operator may easily couple the first member and the second member together while performing tightening using a tightening force necessary to deform the elastic sealing member by a necessary amount.

DETAILED DESCRIPTION

A description will be given of an embodiment of a sample vaporization unit in a gas chromatograph to which a member coupling mechanism according to the invention is applied with reference to drawings.

Figure 1:
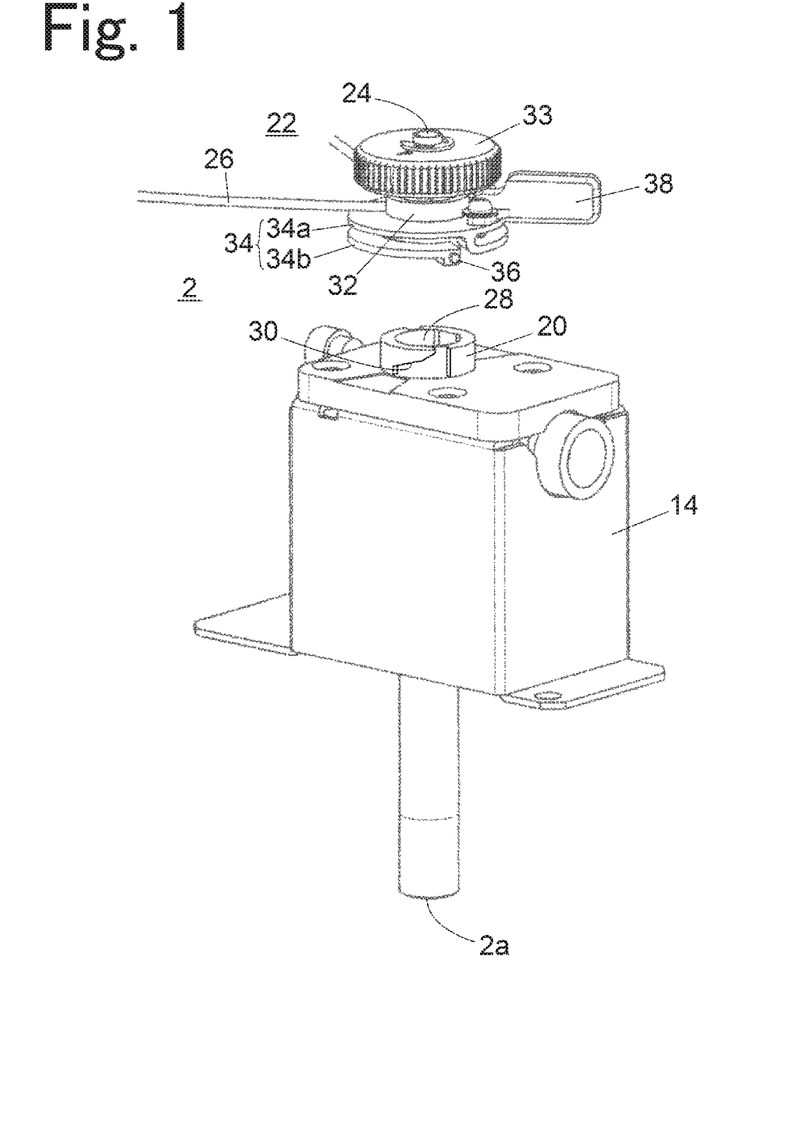
FIG. 1 is a perspective view illustrating an embodiment of a sample vaporization unit to which a member coupling mechanism according to the invention is applied before a seal cap is mounted.
Figure 2:
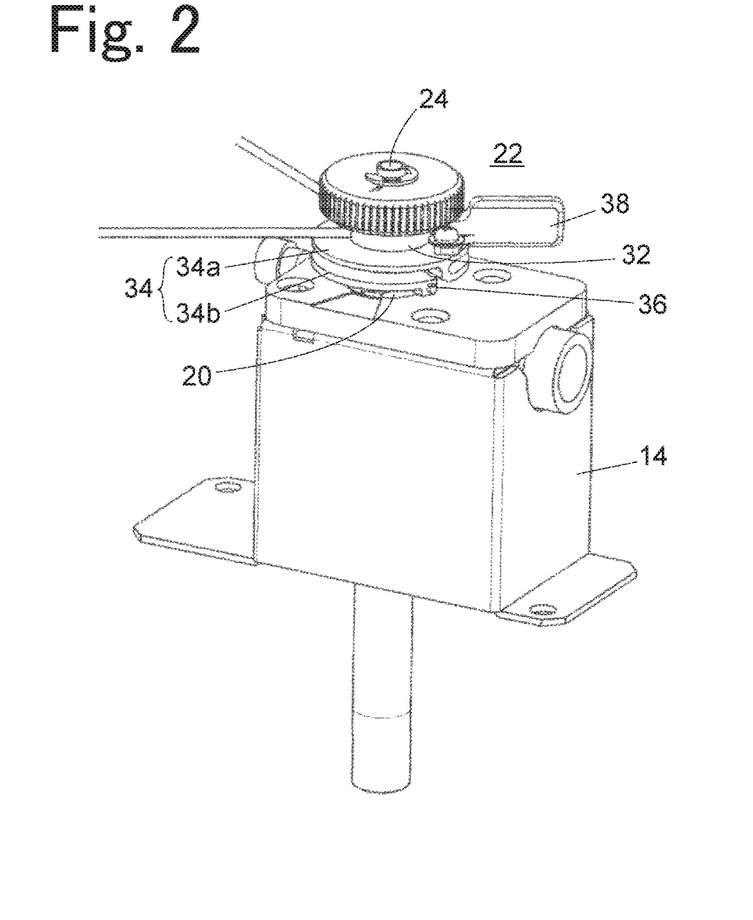
FIG. 2 is a perspective view of the same embodiment after the seal cap is mounted.
Figure 3:
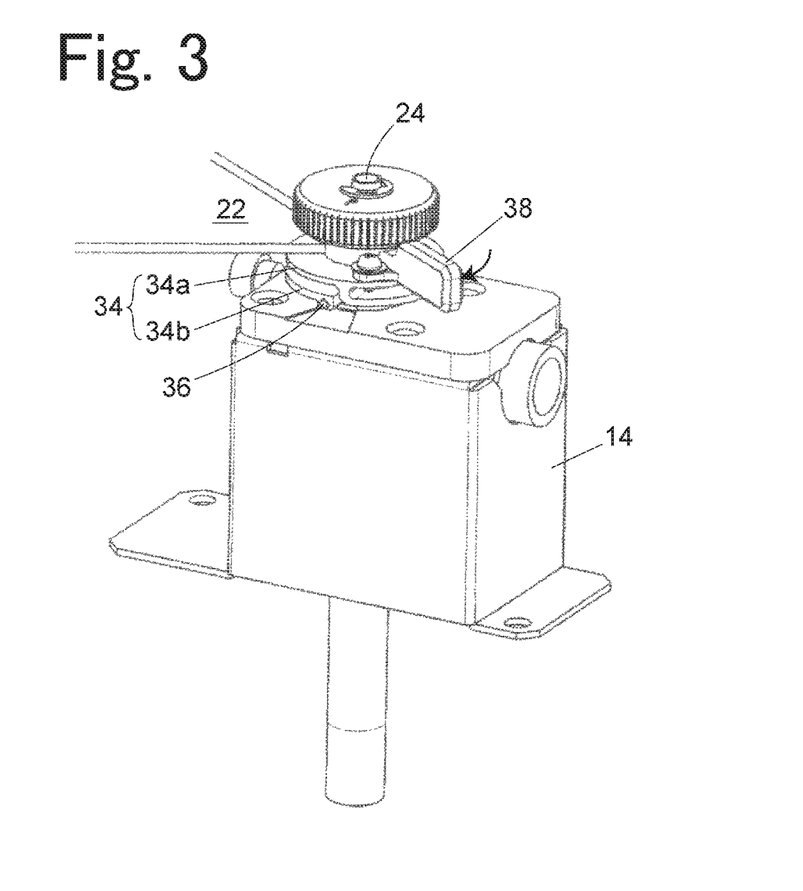
FIG. 3 is a perspective view of the same embodiment after the seal cap is fixed.

As illustrated in FIG. 1 to FIG. 3, a housing 14 (first member) of a sample vaporization unit 2 has a prismatic shape in this embodiment. The shape of the housing 14 is not limited to the prismatic shape, and may be a cylindrical shape or another shape. The housing 14 includes a space 14a (see FIG. 4, hereinafter referred to as an internal space 14a) for accommodating an insert 16 therein. The internal space 14a has a cylindrical hole that leads from an upper surface of the housing 14 to an outlet 2a in a lower part. The housing 14 is made of a metal material having excellent thermal conductivity. A heater (not illustrated) is buried in the housing 14 to surround a periphery of the internal space 14a, and the insert 16 accommodated in the internal space 14a is heated by the heater. The insert 16 is a cylindrical member made of quartz glass, etc.

An opening 28 of the housing 14 is sealed by a seal cap 22 (second member). The seal cap 22 includes a cylindrical seal cap body 32 and a disc-shaped septum cover 33 attached to an uppermost part of the seal cap body 32. A needle insertion portion 24 is provided in the septum cover 33.

Figure 4A:
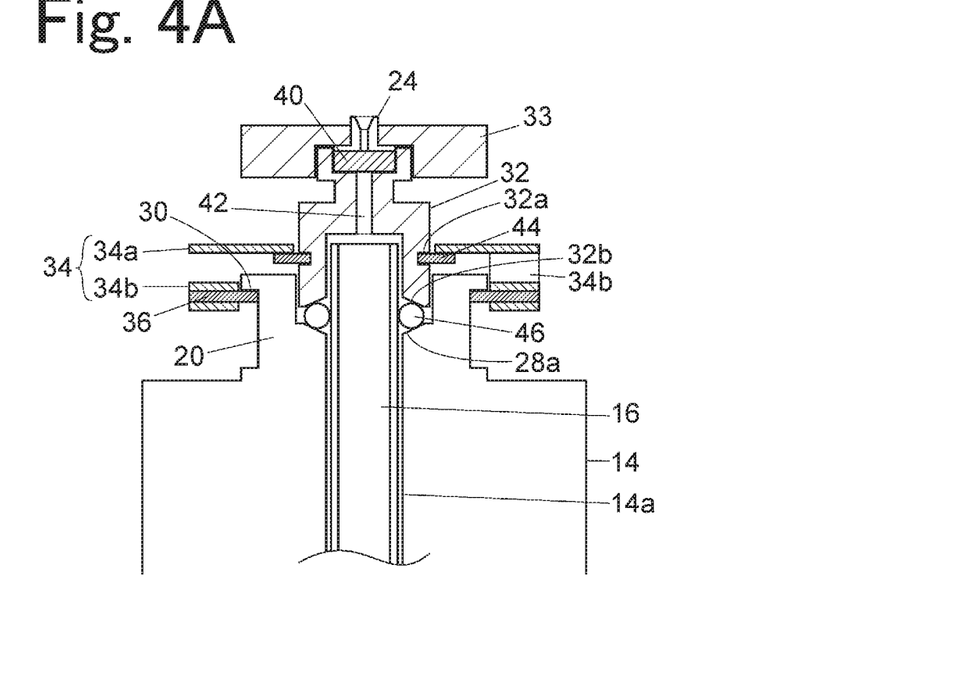
FIG. 4A is a cross-sectional view illustrating a state before the seal cap is fastened in the same embodiment.

As illustrated in FIG. 4A, the septum cover 33 is mounted in the uppermost part of the seal cap body 32 so that the septum 40 is disposed in the uppermost part of the seal cap body 32 and the needle insertion portion 24 is located above the septum 40. The septum 40 can be penetrated by a needle for sample injection inserted from the needle insertion portion 24 and closes a through-hole due to the needle by elasticity thereof after withdrawing the needle. For example, the septum 40 is made of an elastic material such as natural rubber or silicone rubber. The sample is discharged from a distal end of the needle penetrating the septum 40 to the insert 16 side through a through-hole 42 at a center of the seal cap body 32.

An edge of the opening 28 on the upper surface of the housing 14 projects upward in an annular shape to form a cap mounting portion 20 (member coupling portion). The seal cap 22 is fixed to the cap mounting portion 20 by a coupling member 34. A stepped portion 30 is provided at each of two symmetrical positions on an outer peripheral surface of the cap mounting portion 20. The stepped portion 30 is inclined along a circumferential direction of the cap mounting portion 20 from a distal end side to a proximal end side of the cap mounting portion 20. The stepped portion 30 has a side surface facing the proximal end side of the cap mounting portion 20. When the seal cap 22 is mounted on the housing 14, a pin 36 of the coupling member 34 attached to the seal cap 22 is engaged with the side surface of the stepped portion 30. When the coupling member 34 is rotated within a plane (rotational plane) perpendicular to an axial direction of the cap mounting portion 20, the pin 36 slides along the side surface of the stepped portion 30 and is displaced in the axial direction of the cap mounting portion 20.

Figure 5A:
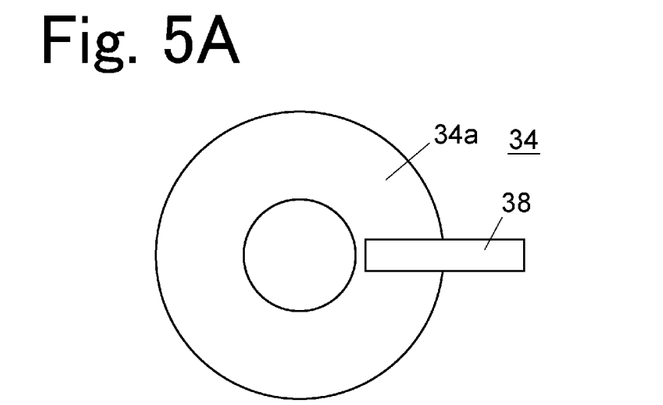
FIG. 5A is a plan view illustrating a coupling member of the member coupling mechanism in the same embodiment.
Figure 5B:
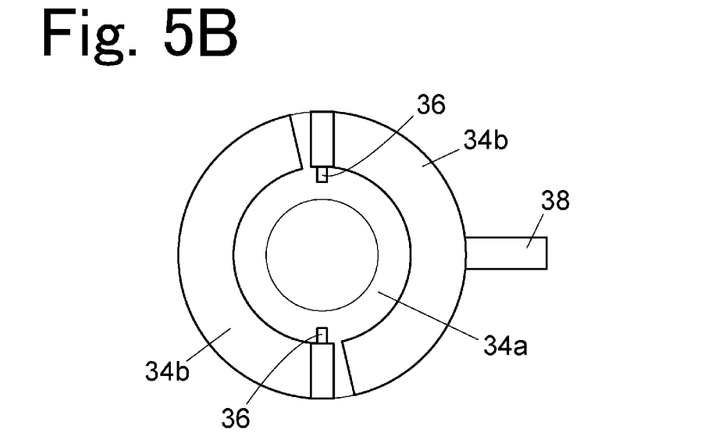
FIG. 5B is a bottom view of the coupling member of the same embodiment.
Figure 5C:
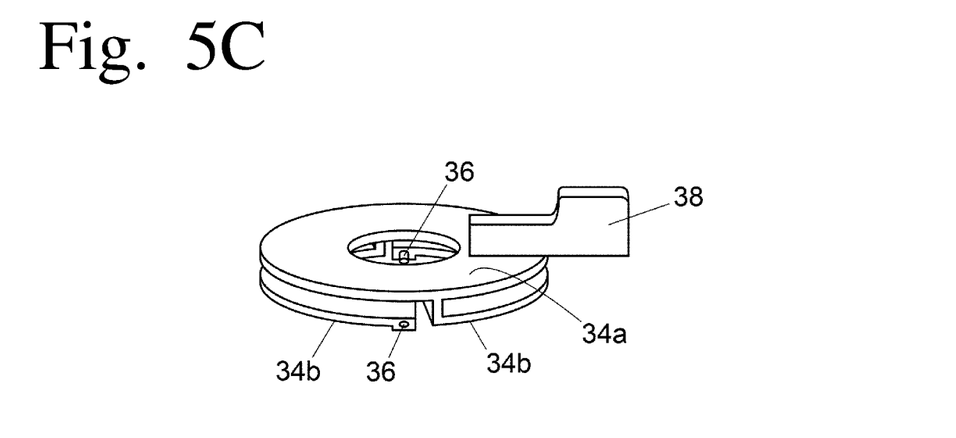
FIG. 5C is a perspective view of the coupling member of the same embodiment.

As illustrated in FIG. 5A to FIG. 5C, the coupling member 34 includes a ring-shaped coupling member body 34a in which a hole is provided at a center and two elastically deformed portions 34b on one surface side of the coupling member body 34a. When a side of the coupling member 34 at which the elastically deformed portions 34b are not provided is defined as a front side, and a side at which the elastically deformed portions 34b are provided is defined as a back side, the coupling member 34 is attached to the seal cap body 32 such that the back side thereof faces the housing 14 side.

Each of the elastically deformed portions 34b of the coupling member 34 is provided at a certain interval from the coupling member body 34a to draw an arc along a peripheral edge of the coupling member body 34a. A proximal end of the elastically deformed portion 34b is integrated with the coupling member body 34a, but a distal end thereof is a free end. That is, the elastically deformed portion 34b forms a cantilever spring. The pin 36 (first engaged portion) forming a projection projecting inward is provided at the distal end of the elastically deformed portion 34b. The two elastically deformed portions 34b have the same shape, and pins 36 at respective distal ends thereof are disposed at positions facing each other. A lever 38 (acting portion) for holding and rotating the coupling member 34 is provided in the coupling member body 34a.

In this embodiment, the coupling member body 34a and the elastically deformed portion 34b of the coupling member 34 are integrally formed by scraping out from a metal block, a manufacturing method such as metal injection molding (MIM). The coupling member body 34a and the elastically deformed portion 34b may be formed as separate parts and then coupled. In this case, materials of the coupling member body 34a and the elastically deformed portion 34b may not be the same.

The coupling member body 34a is engaged with the seal cap body 32 such that movement in a circumferential direction of an outer peripheral surface thereof is allowed. That is, the coupling member body 34a is included in a second engaged portion engaged with an end portion of the seal cap body 32, which is the second member, on the housing 14 side.

Specifically, as illustrated in FIG. 4A, a horizontal groove 32a which is an annular recess provided in the circumferential direction is provided on the outer peripheral surface of the seal cap body 32. A C-shaped snap ring 44 is fitted into the horizontal groove 32a. The C-shaped snap ring 44 is a C-shaped metal member having a notch in part and has an inner diameter of approximately the same size as an outer diameter of a part of the seal cap body 32 in which the horizontal groove 32a is provided and an outer diameter larger than an outer diameter of a part of the seal cap body 32 in which the horizontal groove 32a is not provided. An inner diameter of a center hole of the coupling member body 34a of the coupling member 34 is larger than the outer diameter of the part of the seal cap body 32 in which the horizontal groove 32a is not provided and smaller than the outer diameter of the C-shaped snap ring 44. The seal cap body 32 is fit into the center hole of the coupling member body 34a so that the C-shaped snap ring 44 comes under the coupling member body 34a. Instead of the horizontal groove 32a and the C-shaped snap ring 44, a flange protruding in the circumferential direction from the outer peripheral surface of the seal cap body 32 may be provided integrally with the seal cap body 32.

Figure 6:
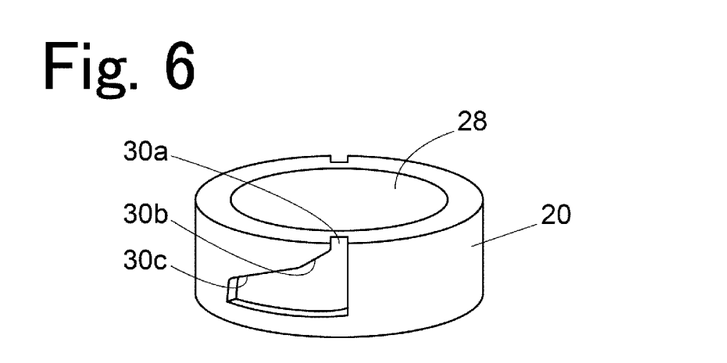
FIG. 6 is a perspective view of a cap mounting portion of the same embodiment.

As illustrated in FIG. 6, the stepped portion 30 includes a recess 30a, into which the pin 36 is fit, provided on an outer side on an upper end surface of the cap mounting portion 20 and mutually contiguous side surfaces 30b and 30c facing the proximal end side of the cap mounting portion 20. The seal cap 22 is fixed to the cap mounting portion 20 by putting the seal cap 22 on the cap mounting portion 20 so that the pin 36 at the distal end of the elastically deformed portion 34b of the coupling member 34 is fit into the recess 30a (state of FIG. 2) and rotating the coupling member 34 in one direction (clockwise direction in FIG. 6A) so that the pin 36 is slid along the side surfaces 30b and 30c of the stepped portion 30 (state of FIG. 3).

The side surfaces 30b and 30c of the stepped portion 30 are inclined with respect to the rotational plane of the coupling member 34 so that the side surfaces are displaced to the proximal end side of the cap mounting portion 20 as the pin 36 fit into the recess 30a moves clockwise along the outer peripheral surface of the cap mounting portion 20. Inclination angles of the side surfaces 30b and 30c are different from each other, and the inclination angle of the side surface 30c is gentler than the inclination angle of the side surface 30b.

As illustrated in FIG. 4A, an O-ring 46 (elastic sealing member) for sealing a gap between the outer peripheral surface of the insert 16 and an inner wall surface of the internal space 14a is disposed on the opening side of the internal space 14a of the housing 14. For example, the O-ring 46 is made of fluororubber, etc. An annular pedestal 28a inclined such that an inner diameter thereof decreases toward a lower side is provided around the opening 28 on an internal side wall of the housing 14, and the O-ring 46 is supported by the pedestal 28*a*. The seal cap body 32 has a recess for accommodating an upper end of the insert 16 on a lower surface side, and a lower end portion thereof is accommodated in the opening 28, so that the O-ring 46 is inserted between the seal cap body 32 and the pedestal 28*a*. An annular lower end surface of the seal cap body 32 is inclined so that an inner diameter thereof becomes larger toward a lower side contrary to the pedestal 28*a*.

Figure 4B:
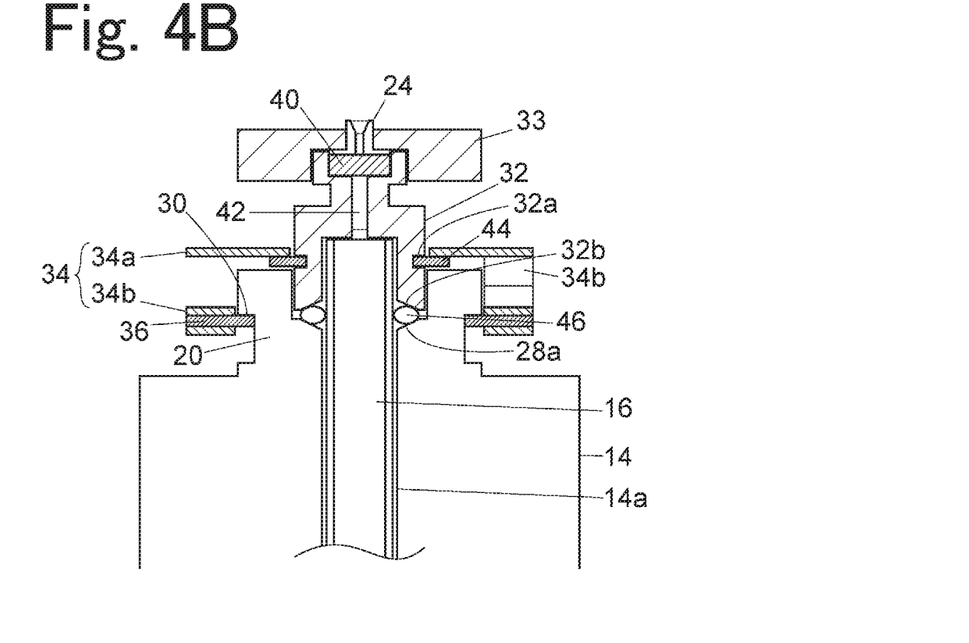
FIG. 4B is a cross-sectional view illustrating a state when the seal cap is fastened in the same embodiment.

When the seal cap 22 is put on the cap mounting portion 20 so that the pin 36 of the coupling member 34 is aligned with the recess 30*a* of the stepped portion 30, a lower end of the seal cap body 32 comes into contact with the O-ring 46. In this state, when the coupling member 34 is rotated so that the pin 36 slides along the side surfaces 30*b* and 30*c* of the stepped portion 30, the pin 36 is displaced to the proximal end side of the cap mounting portion 20, and the coupling member body 34*a* presses the C-shaped snap ring 44 downward as illustrated in FIG. 4B. In this way, the seal cap body 32 is pressed downward. Since the coupling member 34 presses the seal cap body 32 downward while rotating independently of the seal cap body 32 by the coupling member body 34*a* engaged with the C-shaped snap ring 44, only the coupling member 34 may be rotated without rotating the seal cap 22.

The elastically deformed portion 34*b* of the coupling member 34 is elastically deformed to displace a position of the pin 36 in the axial direction of the cap mounting portion 20 relative to the coupling member body 34*a* and has a spring property which generates a restoring force corresponding to the amount of displacement. When the coupling member 34 rotates and the pin 36 reaches an endpoint of the side surface 30*c* of the stepped portion 30, the seal cap body 32 is pressed in a direction of pushing the seal cap body 32 into the opening 28 by an elastic force of the elastically deformed portion 34*b*. In this way, the O-ring 46 is deformed to such an extent that gas is completely prevented from entering the gap between the inner wall surface of the internal space 14*a* and the outer peripheral surface of the insert 16.

In the coupling member 34, for example, the coupling member body 34*a* has a thickness of about 1 mm and an outer diameter of about 30 mm, the elastically deformed portion 34*b* has a thickness of about 1.5 mm and an outer diameter of about 30 mm, and a gap between the coupling member body 34*a* and the elastically deformed portion 34*b* is about 2 mm.

A material having a tensile strength of about 1000 MPa such as stainless steel (for example, SUS630, etc.) subjected to precipitation hardening treatment or solid solution treatment, stainless steel (for example, SUS301 CSP, SUS304 CSP, etc.) as a spring material, alloy steel (for example, SCM420, SCM445, SNCM630, etc.), a titanium alloy (for example, Ti-6Al-4V (64 titanium), etc.), or a copper alloy (for example, beryllium copper, phosphor bronze, etc.) is suitable for a material of the coupling member 34.

A cross-sectional shape of the elastically deformed portion 34*b* is a rectangle, a spring constant thereof is 30 N/mm or more, and an elastic force of about less than 100 N is generated even when the maximum displacement amount is 2 mm or less. In this way, despite the total thickness of the coupling member 34 being 20 mm or less, it is possible to obtain a tightening force necessary for deforming the O-ring 46 by a necessary amount.

In the embodiment described above, since the coupling member 34 includes two disc members (the coupling member body 34*a* and the two elastically deformed portions 34*b*), an area of a surface in contact with the outside air is large, and a role of a radiation fin is fulfilled. In this way, the seal cap 22 is quickly cooled.

The invention claimed is:

1. A member coupling mechanism comprising:
   a first member including a member coupling portion having an open apical surface;
   a second member coupled to the member coupling portion of the first member;
   an elastic sealing member inserted between the first member and the second member to seal an opening of the apical surface of the member coupling portion;
   a coupling member including a first engaged portion engaged with an end portion on a side of the apical surface in the member coupling portion of the first member, a second engaged portion engaged with an end portion of the second member on a side of the first member, the second member being disposed on a side of the member coupling portion of the first member, and an elastically deformed portion which is elastically deformed and generates an elastic force for deforming the elastic sealing member by an amount necessary for airtightness by pressing the elastic sealing member using the first engaged portion and the second engaged portion in a direction in which the first engaged portion and the second engaged portion approach each other when an deformation amount becomes a predetermined amount;
   an acting portion that exerts a force for elastically deforming the elastically deformed portion on the coupling member; and
   a stepped portion inclined along the circumferential direction of the member coupling portion from a distal end side to a proximal end side of the member coupling portion to elastically deform the elastically deformed portion by engaging with the projection and sliding the projection, provided on the outer peripheral surface of the member coupling portion of the first member, the stepped portion having a first inclined side surface and a second inclined side surface, an inclination angle of the first side surface being different than an inclination angle of the second side surface.

2. The member coupling mechanism according to claim 1, wherein both the member coupling portion of the first member and the end portion of the second member on the side of the first member have cylindrical shapes,
   the coupling member includes a ring-shaped coupling member body forming the second engaged portion by engaging with the second member while surrounding a periphery of the end portion of the second member on the side of the first member,
   the elastically deformed portion is an arcuate cantilever spring which is provided on the first member side of the coupling member body with an interval from the coupling member body such that a proximal end is coupled with the coupling member body and a distal end extends in parallel to the coupling member body along a circumferential direction of the coupling member body and is elastically deformed in a direction perpendicular to the apical surface of the first member,
   the first engaged portion includes a projection projecting from a distal end portion of the elastically deformed portion toward an outer peripheral surface of the member coupling portion, and the acting portion includes a lever that rotates the coupling member body within a plane parallel to the apical surface of the member coupling portion of the first member.

3. The member coupling mechanism according to claim 2, wherein the elastically deformed portion includes a horn spring.

4. The member coupling mechanism according to claim 1, wherein a length from an end portion of the coupling member on a side of the second member to an end portion thereof on a side of the first member in a direction perpendicular to the apical surface of the member coupling portion is 20 mm or less in a state in which the elastically deformed portion is not elastically deformed.

5. The member coupling mechanism according to claim 1, wherein a spring constant of the elastically deformed portion is 30 N/mm or more and 100 N/mm or less.

* * * * *